United States Patent [19]
Muller

[11] 3,835,712
[45] Sept. 17, 1974

[54] WHEEL BALANCING APPARATUS

[75] Inventor: Richard Muller, Worfelden, Germany

[73] Assignee: Gebr. Hofman KG, Darmstadt, Germany

[22] Filed: Feb. 28, 1973

[21] Appl. No.: 336,895

[30] Foreign Application Priority Data
Mar. 20, 1972 Germany.......................... 2213449

[52] U.S. Cl. ............................................. 73/462
[51] Int. Cl. ............................................. G01m 1/22
[58] Field of Search.............................. 73/462, 464

[56] References Cited
UNITED STATES PATENTS
2,116,221  5/1938  Sivertsen............................... 73/462

*Primary Examiner*—James J. Gill
*Attorney, Agent, or Firm*—Cushman, Darby & Cushman

[57] ABSTRACT

An apparatus for balancing a rotary body with a balancing spindle for carrying the rotary body to be balanced, means for measuring and storing the angular position of unbalance of the rotary body, a phase displacement device non-rotatably connected to the balancing spindle and in operation receiving a reference phase signal from the measuring means and delivering an output voltage whose phase position represents a measurement of the angular position of unbalance, and an indicator comprising a scale for indicating only a part of the whole angular range of 360°, which part is adjacent to the value zero on the scale, a pointer which can be set to the value zero on the scale by rotation of the phase displacement means and the rotary body, for rotating the rotary body into the correct position for a balancing operation, and two illuminatable direction-indicator means, the brightness of illumination of each of the direction-indicator means being independently controllable by the output voltage of the phase displacement means and by the stored measurement value in said measuring means, whereby any difference in the brightness of illumination of each of the direction-indicator means indicates the direction in which the rotary body must be rotated to move it towards the correct position and to bring the pointer into the range of the scale.

3 Claims, 2 Drawing Figures

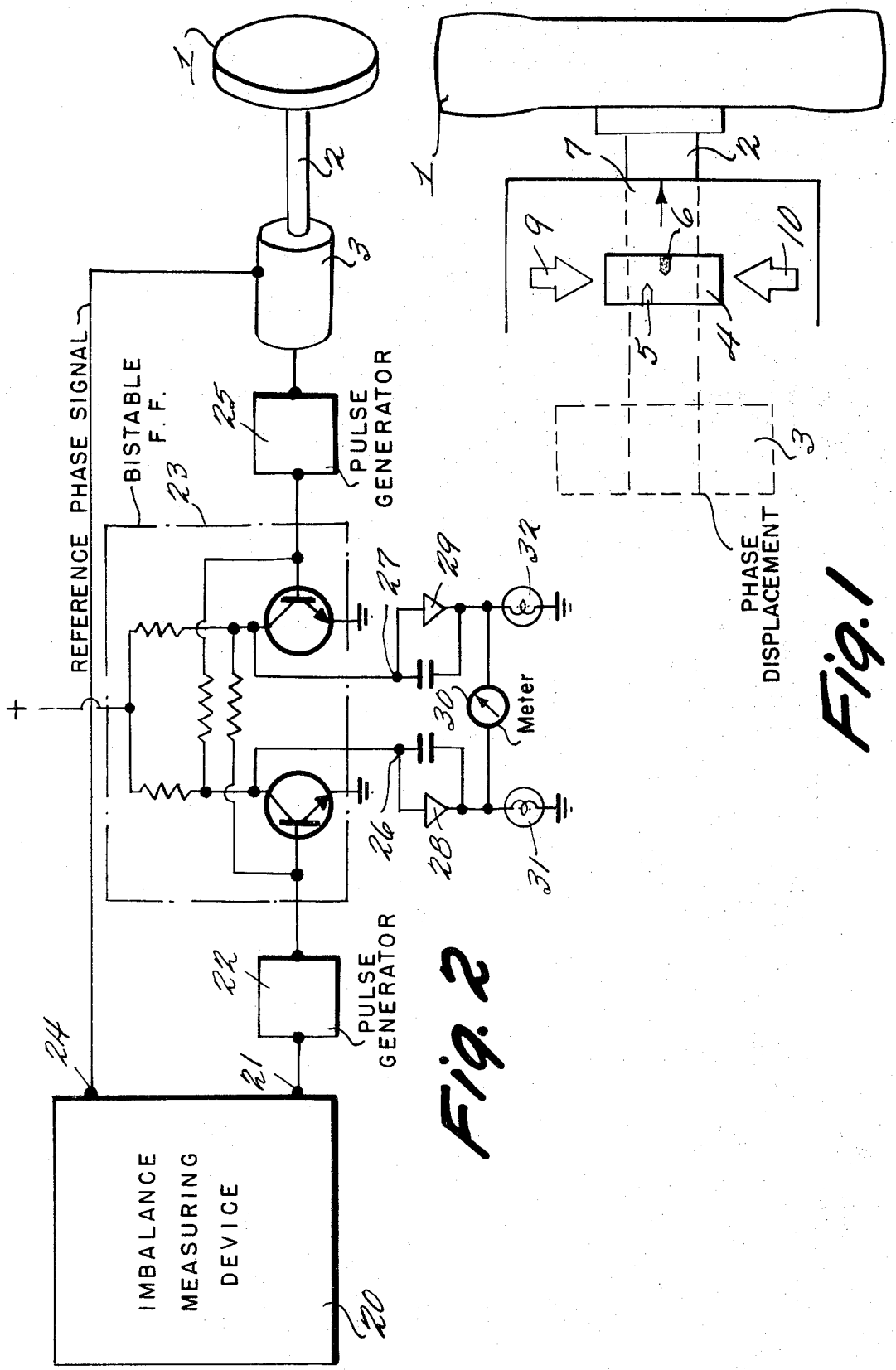

WHEEL BALANCING APPARATUS

The invention relates to balancing apparatuses for balancing rotary bodies.

According to the present invention, there is provided apparatus for balancing a rotary body, comprising a balancing spindle for carrying the rotary body to be balanced, means for measuring and storing the angular position of unbalance of the rotary body, a phase displacement means non-rotatably connected to the balancing spindle and in operation receiving a reference phase signal from the measuring means and delivering an output voltage whose phase position represents a measurement of the angular position of unbalance, and an indicator comprising a scale for indicating only a part of the whole angular range of 360°, which part is adjacent to the value zero on the scale, a pointer which can be set to the value zero on the scale by rotation of the phase displacement means and the rotary body, for rotating the rotary body into the correct position for a balancing operation, and two illuminatable direction-indicator means, the brightness of illumination of each of the direction-indicator means being independently controllable by the output voltage of the phase displacement means and by the stored measurement value in said measuring means, whereby any difference in the brightness of illumination of each of the direction-indicator means indicates the direction in which the rotary body must be rotated to move it towards the correct position and to bring the pointer into the range of the scale.

A balancing apparatus according to the present invention will now be described by way of example with reference to the accompanying drawing in which:

FIG. 1 shows a diagrammatic view of part of the balancing apparatus.

FIG. 2 shows an embodiment of the circuit of the balancing apparatus.

Referring firstly to FIG. 1, the balancing apparatus comprises a balancing spindle 2 on which in use a rotary body 1 to be balanced, for example a motor vehicle wheel is secured. Connected non-rotatably to the balancing spindle 2 is a conventional phase displacement device 3. Such devices are described in greater detail in co-pending applications Ser. No. 223,213, filed Feb. 3, 1972 and U.S. Pat. No. 273,808, filed July 21, 1972, the disclosures of which are explicitly incorporated herein by reference. Arranged adjacent to, such as above, balancing spindle 2 is an indicator instrument 4 such as an electrical meter which has a scale (not shown) and a pointer 5. The value zero on the scale is denoted by a suitable reference marker 6.

The arrangement of the above components of the apparatus is such that, as will be described in greater detail hereinafter, when the balancing spindle 2 and a rotary body 1 thereon are rotated, the pointer 5 is displaced in such a way as if it were non-rotatably connected thereto. However, as will also be described in greater detail hereinafter, the displacement of the pointer 5 does not occur over the entire angular range of 360°, but only within a small angular range of, for example ± 10° on each side of the zero value on the scale, between two suitable abutments which, for the sake of simplicity, are not shown in the drawing.

The remaining part of the whole angular range, which is not covered by the scale, since the scale only concerns a fraction of the total range, is represented by two illuminatable direction indicators in the form of two arrows 9 and 10 which indicate by their relative brightness the direction in which the rotary body 1 must be rotated in order for the pointer 5 to be moved from its abutment into the region of the scale. Reference is then made to the pointer 5 for finally bringing the rotary body 1 into the correct position required for the balancing operation. The position on the rotary body at which unbalance compensation must be effected, is indicated on the housing of the balancing apparatus by a stationary marking 7.

Referring now to FIG. 2, the apparatus also includes a conventional imbalance measuring device 20 in which the measured unbalance of the rotary body 1 is stored in the form of a sine-wave voltage of a fixed frequency, which continues to be available at a first terminal 21 after the balancing apparatus has come to a halt. The sine-wave voltage is converted by a first pulse generator 22 into a train of positive pulses, fixed in phase with respect to each other. Pulse generator 22 is connected to a bistable flip-flop 23, the pulses from the pulse generator 22 controlling bistable flip-flop 23 to switch it into one of its two given states.

Imbalance measuring device 20 also has a second terminal 24 which supplies a reference phase signal to the phase displacement device 3. The phase of the signals from device 20 thus define a reference position. Accordingly, the phase displacement of the output voltage of the phase displacement device 3 from the output of measuring device 20 therefore represents a measurement of the angular position of rotary body 1. The output voltage of the phase displacement device 3 is also converted into positive pulses by means of a second pulse generator 25 which is operatively connected to bistable flip-flop 23 for switching it into the other of its two states.

Bistable flip-flop 23 has two outputs 26 and 27. Rectangular-wave voltages occur at the outputs 26 and 27 when two pulses from the pulse formers 22 and 25 cooperate. Adjustment is now selected in such a way that the rectangular-wave voltages at the two outputs 26 and 27 assume the same pulse relationship when the phase displacement device 3 and the rotary body 1 are both in the position required for the balancing operation.

The two rectangular-wave voltages at the outputs 26 and 27 are converted into direct-current voltages by integrators 28 and 29 which are respectively connected to the outputs 26 and 27, so that, when the phase displacement device and the rotary body 1 are in the position for balancing as mentioned above, equal direct-current voltages occur at the outputs of the integrators 28 and 29. These voltages cause two lamps 31 and 32 which are respectively connected to the outputs of the integrators 28 and 29 to be lit with equal brilliance. A measuring instrument 30, corresponding to the indicator instrument 4 in FIG. 1, is connected between the input leads into the two lamps 31 and 32 so that, when the voltages at the outputs of the integrators 28 and 29 are equal, and the lamps 31 and 32 are equally brilliantly lit, no current will flow through the instrument 30 and it indicates the value zero.

When the rotary body 1 is rotated, the phase position of the pulses of the pulse generator 25 and thus the relationship between the voltages at the two outputs 26 and 27 is changed in such a way that the rectangular-wave pulses at the output 27 become, for example, of greater length, while the rectangular-wave pulses at the output 26 become of shorter length. As a result, the voltage at the output of the integrator 29 increases, while the voltage at the output of the integrator 28 decreases. This causes an increase in the brightness of illumination of the lamp 32, and a reduction in that of the lamp 31. The measuring instrument 30 also shows a deflection which, with correct polarity, indicates in the direction in which the rotary body 1 was rotated.

As the two lamps 31 and 32 serve to illuminate the arrows 9 and 10, accordingly the arrows 9 and 10 are lit with varying degrees of brightness. The direction in which the rotary body 1 must be rotated in order to move it into the position required for the balancing operation follows directly from the indication given by the arrows 9 and 10. The rotary body 1 can, therefore, be turned into the position for balancing rapidly and over the shortest distance. When the pointer 5 reaches the marking 6 which represents the zero value on the scale, the rotary body 1 has been turned into the correct position for balancing. Apart from the position of the pointer 5, the correctness of this position can also be checked by reference to the brightness of the two lamps 31 and 32 and thus, the two arrows 9 and 10 which are equally brightly lit in the correct position for balancing of the rotary body 1. It is also possible for the rotary body 1 to be moved into the correct position for balancing even if the lamps 31 and 32 are defective or if the indicator instrument 30 is defective, for under exceptional circumstances, one of the two possible means of indication is sufficient.

The above-described balancing apparatus can also be used for balancing in one or in two balancing planes. For balancing in two planes, either two indicator instruments such as 30 must be provided, or suitable switching over must be effected.

In the above-described balancing apparatus, the scale of the indicator instrument includes only the region which is of interest, in the vicinity of the zero value, that is to say, a range for example, of ± 10°, while the remaining part of the angular range of 360° is formed by the illuminated arrows which virtually represent an extension of the scale on both sides. This gives the advantage that the indicator instrument can be made substantially smaller, while nevertheless, the precision of indication and reading-off can be maintained or even substantially improved.

Many changes and modifications in the above-described embodiment of the invention are possible without departing from the scope thereof. Accordingly, that scope is intended to be limited only by the scope of the appended claims.

What is claimed is:

1. Apparatus for balancing a rotary body, comprising:

means for mounting the rotary body to be balanced, means for measuring and storing the angular position of an unbalance of the rotary body, a phase displacement means connected to the balancing spindle and to said measuring and storing means for receiving a reference phase signal from said measuring and storing means and delivering an output voltage whose phase position varies as a function of said angular position of imbalance, and indicator means including a scale for indicating only a part of the whole angular range of 360°, which part is adjacent to the value zero on the scale, a pointer which can be set to the value zero on the scale by rotation of said phase displacement means and the rotary body, for rotating the rotary body into the correct position for a balancing operation, two illuminatable direction-indicator means, and means for controlling the brightness of illumination of each of the direction-indicator means independently as a function of said output voltage of said phase displacement means and by the stored measurement value in said measuring means so that the difference in the brightness of illumination of each of the direction-indicator means indicates the direction in which the rotary body must be rotated to move it towards said correct position and to bring said pointer into the range of said scale.

2. Apparatus according to claim 1 wherein each said direction-indicator means comprises means defining the shape of an arrow.

3. Apparatus according to claim 1 wherein said controlling means includes respective pulse generators for converting the stored measurement value in said measuring means and the output voltage of said phase displacement means into pulses, a bistable element connected to said two pulse generators and controllable by said pulses, the bistable element having two outputs at which in operation rectangular-wave voltages occur, a respective integrator connected to each of said outputs and operative to convert said rectangular-wave voltages into direct-current voltages, and wherein each said direction-indicator means includes a respective lamp connected to each of said two integrators, the brightness of illumination of which lamps in operation corresponds to the magnitude of the direct-current voltages.

* * * * *